United States Patent [19]
Hartig et al.

[11] Patent Number: 5,557,462
[45] Date of Patent: Sep. 17, 1996

[54] DUAL SILVER LAYER LOW-E GLASS COATING SYSTEM AND INSULATING GLASS UNITS MADE THEREFROM

[75] Inventors: Klaus W. Hartig, Brighton; Steven L. Larson, Monroe; Philip J. Lingle, Temperance, all of Mich.

[73] Assignee: Guardian Industries Corp., Auburn Hills, Mich.

[21] Appl. No.: 373,085

[22] Filed: Jan. 17, 1995

[51] Int. Cl.⁶ ....................................................... G02B 1/10
[52] U.S. Cl. .......................... 359/585; 359/580; 359/588
[58] Field of Search .................................... 359/359, 360, 359/580, 584, 585, 589, 588

[56] References Cited

U.S. PATENT DOCUMENTS

| | | |
|---|---|---|
| 3,272,986 | 9/1966 | Schmidt . |
| 3,649,359 | 3/1972 | Apfel et al. . |
| 3,682,528 | 8/1972 | Apfel et al. . |
| 3,698,946 | 10/1972 | Kaspaul et al. . |
| 3,846,152 | 11/1974 | Franz . |
| 3,889,026 | 6/1975 | Groth . |
| 3,900,673 | 8/1975 | Mattimoe et al. . |
| 3,901,997 | 8/1975 | Groth . |
| 3,962,488 | 6/1976 | Gillery . |
| 3,978,273 | 8/1976 | Groth . |
| 3,990,784 | 11/1976 | Gelber . |
| 4,179,181 | 12/1979 | Chang . |
| 4,204,942 | 5/1980 | Chahroudi . |
| 4,335,166 | 6/1982 | Lizardo et al. . |
| 4,337,990 | 7/1982 | Fan et al. . |
| 4,356,073 | 10/1982 | McKelvey . |
| 4,422,916 | 12/1983 | McKelvey . |
| 4,488,775 | 12/1984 | Yamamoto . |
| 4,556,277 | 12/1985 | Fan et al. . |
| 4,639,069 | 1/1987 | Yatabe et al. . |
| 4,716,086 | 12/1987 | Gillery et al. . |
| 4,780,372 | 10/1988 | Tracy et al. . |
| 4,786,784 | 11/1988 | Nikodem et al. . |
| 4,799,745 | 1/1989 | Meyer et al. . |
| 4,943,484 | 7/1990 | Goodman . |
| 5,085,926 | 2/1992 | Iida et al. ........................... 359/360 |
| 5,229,194 | 7/1993 | Lingle et al. . |
| 5,296,302 | 3/1994 | O'Shanghassy et al. . |
| 5,302,449 | 4/1994 | Eby et al. . |
| 5,318,685 | 6/1994 | O'Shanghassy et al. . |
| 5,332,888 | 7/1994 | Tausch et al. . |
| 5,344,718 | 9/1994 | Hartig et al. . |
| 5,377,045 | 12/1994 | Wolfe et al. . |
| B1 4,799,745 | 1/1992 | Meyer et al. . |

FOREIGN PATENT DOCUMENTS

| | | |
|---|---|---|
| 031278 | 12/1980 | European Pat. Off. . |
| 0080182 | 6/1983 | European Pat. Off. . |
| 2027223 | 2/1980 | United Kingdom . |
| 9005439 | 5/1990 | WIPO . |

OTHER PUBLICATIONS

NFRC 100–91 "Procedure for Determining Fenestration Product Thermal Properties" (Currently Limited to U–Valves) (1991) No Month.

NFRC 301–93 "Standard Test Method for Emittance of Specular Surfaces Using Spectrometric Measurements" (Jan. 1993).

NFRC 200–93 "Procedure for Determining Fenestration Product Solar Heat Gain Coefficients at Normal Incidence" (Jan. 1993).

Viracon, "Solarscreen 2,000™ New Product Bulletin" (4 pages), 1994 No Month.

(List continued on next page.)

*Primary Examiner*—Paul M. Dzierzynski
*Assistant Examiner*—Darren E. Schuberg
*Attorney, Agent, or Firm*—Myers, Liniak & Berenato

[57] ABSTRACT

A sputter-coated glass layer system particularly useful in insulating glass units ("IGs"), which includes dual layers of silver separated by a layer of $Si_3N_4$ having a thickness of about 700 Å–1,100 Å and further including an undercoat and an overcoat of $Si_3N_4$ having thicknesses of about 300 Å–550 Å and about 350 Å–700 Å respectively, such that a glass so coated achieves normal emissivity values ($E_n$'s) of less than about 0.02–0.09 with good durability and very low reflectance.

17 Claims, 1 Drawing Sheet

OTHER PUBLICATIONS

Viracon, "Solarscreen 2,000 on Tinted Substrates" (1 page), 1994 No Month.

Window 4.1 LBL–35298 (Mar., 1994).

Airco Coating Technology, Super–E IV (1994?), pp. 1–23, (Redacted Form—Pull Form in Sealed Envelope Accompanying Petition to Expunge) (No Month).

ASTM E 424–71 "Standard Test Methods for Solar Energy Transmittance and Reflectance (Terrestrial) of Sheet Materials", Apr. 15, 1971.

1991 Proposed ASTM Standard (Primary Glass Manufacturer's Council) for Measurement of Infrared Energy (2,500–40,000 nm) to Calculate Emittance, Nov. 8, 1991.

Knittl, Zdenek, "Otics of Thin Films", John Wiley & Sons, Ltd., London, 1976, p. 284 (No Month).

Airco Coating Technology, Super–E III, Jan. 1991, pp. 1–22 (Redacted Form—Pull Form in Sealed Envelope Accompanying Petition to Expunge).

ASTM E–308–85 "Standard Method for Computing the Colors of Objects by Using the CIE System", Feb. 22, 1985.

DUAL SILVER LAYER LOW-E GLASS COATING SYSTEM AND INSULATING GLASS UNITS MADE THEREFROM

FIELD OF THE INVENTION

This invention relates to coated glass articles having low emissivity values. More particularly, this invention relates to insulating glass units (e.g. doors and windows) made, in part, from these coated glass articles.

BACKGROUND OF THE INVENTION

The importance of sputter-coated glass layer systems for achieving solar management properties in architectural windows and doors is now well established in commerce. In addition, the importance of using such layer systems in insulating glass units (known as "IG" units in the art) is equally well established. Examples of this latter use include double and triple paned windows and doors made from at least two panes of glass sealed at their peripheral edges to form an insulating chamber therebetween. Such chambers, in this respect, are often filled with a gas other than air, such as argon.

Important to the acceptance of such IG units in the marketplace are the following characteristics which relate directly to the sputter-coated layer system employed:

1) the desired amount of visible transmittance coupled with an acceptable level of infrared radiation reflectance;
2) a non-mirror-like appearance;
3) a color appearance which is either neutral or falls within an acceptable range of shades of a non-objectionable color;
4) resistance to weathering or other chemical attack, often referred to as "chemical durability"; and
5) resistance to abrasion (often referred to as "mechanical durability") during handling, particularly during the various steps necessary to produce an IG window or door from two or more sheets of glass, at least one of which has been pre-sputter-coated with the aforesaid layer system.

In addition to these physical characteristics, the coating system employed must be economical to produce. If it is not, the ultimate product, such as in an IG unit, may become so expensive as to inhibit demand.

It is well-known in the art that these desired characteristics often conflict when attempting to achieve them, and that, therefore, trade-offs often become necessary. For example, achievement of acceptable levels of transmittance or IR (infrared) reflection may have to be at the expense of durability (either chemical or mechanical, or both). In other trade-offs, undesirable colors and mirror-like windows (or doors) become unavoidable. In still further trade-offs, cost of production becomes a significant factor. Such problems create a need in the art for a new sputter-coated layer system which can achieve a better balance among these characteristics.

In U.S. Pat. No. 5,344,718 there are disclosed various excellent sputter-coated layer systems which achieve acceptably low values of emissivity (E), and thus are properly classified as a family of "Low-E" systems (i.e. a family of high IR reflectance coatings as defined below). In addition, such coating systems, as a family, generally exhibit durability characteristics which approach or equal those of pyrolytic coatings and thus are quite acceptable. Still further, these coatings, particularly in their preferred embodiments, exhibit high visible transmittance. At the same time they also exhibit a reasonably neutral color, ranging somewhat into the green side of blue which is, however, reasonably masked by the level of reflectance achieved to thereby appear substantially neutral. In addition, their visible reflectance characteristics are below 20% and thus avoid an undesirable mirror-like appearance when viewed from either the inside or outside when used, for example, as a window or door.

The family of layer systems disclosed in U.S. Pat. No. 5,344,718 employs various layers of $Si_3N_4$ and nickel or nichrome to sandwich one or more layers of IR reflecting metallic silver between them, in a selected order, thereby to achieve the desired end properties. The entire disclosure of this patent, including the "BACKGROUND" section thereof is incorporated herein by reference. Generally speaking this prior patent ('718) achieves its unique results by the use of a system comprised of five or more layers wherein from the glass outwardly the system comprises:

a) an undercoat layer of $Si_3N_4$;
b) a layer of nickel or nichrome;
c) a layer of silver;
d) a layer of nickel or nichrome; and
e) an overcoat layer of $Si_3N_4$.

When the system consists essentially of these five (5) layers, the following thicknesses are generally employed:

| Layer | Range (approx.) |
| --- | --- |
| a ($Si_3N_4$) | 400Å–425Å |
| b (Ni or Ni:Cr) | 7Å or less |
| c (Ag) | 95Å–105Å |
| d (Ni or Ni:Cr) | 7Å or less |
| e ($Si_3N_4$) | 525Å–575Å |

When, in this prior patent ('718), more than five layers are employed, such as when two silver layers are employed, the system from the glass outwardly usually includes the following layers:

glass/$Si_3N_4$/Ni:Cr/Ag/Ni:Cr/Ag/Ni:Cr/$Si_3N_4$. In such a system the total thickness of the silver remains the same (e.g. 95 Å–105 Å) such that each layer of silver itself is only about 50 Å, to make up the total while the thickness of the layers of Ni:Cr and $Si_3N_4$ are the same as in the five layer system.

While such systems as disclosed in this prior '718 patent constitute a significant improvement over then existing prior art systems, particularly those discussed in the "BACKGROUND" section of that patent; nevertheless, there remained room for improvement in the characteristic of "emissivity". For example, in the systems of the '718 patent, normal emissivity ($E_n$) was generally less than or equal to about 0.12 while hemispherical emissivity ($E_h$) was generally less than about 0.16. However, in practice, the lower limits realistically achievable were generally, for $E_n$ about 0.09 and for $E_h$ were about 0.12. Achievable sheet resistances ($R_s$) in this respect were generally forom about –10 $ohms/_{sq.}$ Inhibiting the achievement of better IR reflection (i.e. decreased "E" values) was generally held belief that if the thickness of silver were increased to achieve higher IR reflectance (and thus lower "E" values) at least one or more of the following four detrimental affects would occur: (1) there would result a loss of durability; (2) the ultimate product would be too highly reflective, and thus become mirror-like; (3) the color would be driven to an unacceptably high purple or red/blue appearance; and/or (4) visible transmittance would become unacceptably low.

Durability, both mechanical and chemical, is an important factor to achieve in architectural glass generally whether used as a monolithic sheet or, for example, when used in an IG unit. As aforesaid, the handling, assembling and sealing of IG units places a premium on mechanical durability, while the need to edge seal the panes to create an insulating chamber therebetween creates the need for chemical durability due primarily to the nature of the sealant which inevitably contacts the coating.

Aesthetically, both mirror-like and purple color qualities may eliminate the marketability of any product exhibiting these characteristics. Loss of visible transmittance while undesirable, does not become truly objectionable until, in a monolithic sheet, it drops below about 70% and in an IG unit it drops below about 63%. However, in certain uses, particularly where low shading coefficients (i.e. less than about 0.6) are desired, transmittance may actually be too high, even though emissivity is reasonably low. Generally speaking, where shading qualities are desired (i.e. to lower air conditioning costs), monolithic visible transmittance should be kept below 75% and preferably below 73%, while in a typical IG unit transmittance should be about 65% to 68%.

In partial confirmation of the above beliefs, is the rather complex layer system disclosed in U.S. Pat. No. 5,302,449 as well as its presumed commercial counterpart in IG unit form, known as Cardinal 171 sold by Cardinal IG Company. The layer system as taught in this patent varies the thicknesses and types of materials in the layer stack to achieve certain solar management qualities, as well as employing an overcoat of an oxide of zinc, tin, indium, bismuth, or oxides of their alloys including the oxide of zinc stannate, to achieve abrasion resistance. In addition, the system employs one or two layers of gold, copper or silver to achieve its end results. When two layers of silver are used it is said that the first is between 100 Å–150 Å and preferably about 125 Å in thickness while the second, based thereon, is to be between 125 Å–175 Å. When only one silver layer is employed, it is taught that its thickness is to be about 100 Å–175 Å, and preferably 140 Å. Nowhere does this patent disclose the use of nickel or nichrome, nor the use of silicon nitride as an element(s) in the stack arrangement.

In actual commercial practice, the aforesaid Cardinal IG units have been found to achieve quite acceptable solar management properties including acceptable color characteristics and relatively good non-mirror-like visible reflectance (an example is reported hereinbelow for comparison). However, this otherwise quite acceptable system has been found lacking in chemical durability, and, as defined herein, may be said to lack chemical durability since it fails the prescribed boil test. While the precise reason for this is not known, the simple conclusion is that, as has been indicative of the prior art, sacrifices had to be made in at least one desirable characteristic, in order to achieve desirable levels of the others. In addition, due to the nature of the stack and elements used, the system is quite expensive to produce principally due to the number and thickness of the layers required to achieve the desired result.

In the "BACKGROUND" section of the aforesaid '718 patent there is disclosed a further prior art architectural glass layer system which commercially has become known as Super-E III, a product of the Airco Corporation. This system, from the glass outwardly consists of the following layer stack:

$Si_3N_4$ /Ni:Cr/Ag/Ni:Cr/$Si_3N_4$

It has been found in practice that in this Super-E III system the Ni:Cr alloy is 80/20 by weight Ni/Cr, respectively (i.e. nichrome), the two nichrome layers are reported as being 7 Å thick, the Ag layer is specified as being only about 70 Å thick [except that it is stated that the silver may be about 100 Å thick], and the $Si_3N_4$ layers are relatively thicker (e.g. 320 Å for the undercoat and about 450 Å for the overcoat). In reality, because of its thinness (i.e. about 70 Å), the silver (Ag) layer has been found, in practice, to actually be rather semi-continuous in nature.

While this coating achieved good "durability" (i.e. the coating was scratch resistant, wear resistant and chemically stable) and thus achieved an important measure of this characteristic as compared to pyrolytic coatings, for glass at about 3 mm thick, $E_h$ is only about 0.20–0.22, and $E_n$ is about 0.14–0.17. Both of these emissivity values are rather high. In addition, sheet resistance ($R_s$) measures a relatively high 15.8 ohms/$_{sq.}$ (the more acceptable value being about 10.5 or less). Thus, while both mechanical and chemical durability are found to be quite acceptable and its monolithic sheet visible transmittance was a rather high 76±1%, and while these coatings also proved to be compatible with conventional sealants used in IG units, its ability to handle IR radiation was less than desirable. In addition, its rather high monolithic visible transmittance of 76±1% made such a system rather undesirable when lower shading characteristics were required.

Airco has followed its Super-E III system with what it has designated as its Super-E IV system. This system includes as its layer stack from the glass outwardly the following:

| Element | Thickness (Å) |
| --- | --- |
| $TiO_2$ | Approx. 300 |
| $NiCrN_x$ | Approx. 8 |
| Ag | Approx. 105 |
| $NiCrN_x$ | Approx. 8 |
| $Si_3N_4$ | Approx. 425 |

This system is quite similar in performance to the Super-E III except that visible transmittance is higher (e.g. greater than 80%), emittance is lower (e.g. less than about 0.10) and shading coefficient is significantly higher (e.g. approx. 0.80). In addition, due to the use of $TiO_2$ as an undercoat, the system is expensive to produce.

In addition to these Super-E III and IV layer systems, other coatings containing silver and/or Ni:Cr as layers for infrared reflectance and other light management purposes have been reported in the patent and scientific literature. See, for example, the Fabry-Perot filters and other prior art coatings and techniques disclosed in U.S. Pat. Nos. 3,682,528 and 4,799,745 (and the prior art discussed and/or cited therein). See also the dielectric, metal sandwiches created in numerous patents including, for example, U.S. Pat. Nos. 4,179,181; 3,698,946; 3,978,273; 3,901,997; and 3,889,026 just to name a few. While such other coatings have been known or reported, it is believed that prior to our invention, none of these prior art disclosures teach or have achieved the ability to employ the highly productive sputter-coating process and, at the same time, achieve an architectural glass which not only approaches or equals the durability of pyrolytic coatings, but which also achieves excellent solar management qualities as well.

In short, the above factors in the prior art would lead the skilled artisan directly away from any reasonable suggestion that a substantial thickening of the silver in a system such as the family of systems found in the '718 patent, coupled with an appropriate adjustment of the $Si_3N_4$ thickness, could achieve a full range of desired characteristics particularly in the combined characteristics of: (1) acceptable, non-purple or non-red/blue colors; (2) non-mirror-like appearance, both inside and outside; (3) reasonably high, but not too high transmittance values; (4) good mechanical durability; (5) superior chemical durability; and (6) exceptionally low emissivity values.

In our copending application, Ser. No. 08/356,515 filed Dec. 15, 1994 and entitled "LOW-E GLASS COATING SYSTEM AND INSULATING GLASS UNITS MADE THEREFROM," there is disclosed a family of layer systems which meets the needs of the art in regard to the above-described problems and drawbacks. The layer systems therein disclosed generally include from the glass outwardly:

a) a layer of $Si_3N_4$ having a thickness of about 450 Å–600 Å;

b) a layer of nickel or nichrome having a thickness of about 7 Å or less;

c) a layer of silver having a thickness of about 115 Å–190 Å;

d) a layer of nickel or nichrome having a thickness of about 7 Å or less;

e) a layer of $Si_3N_4$ having a thickness of about 580 Å–800 Å; such that when the glass substrate has a thickness of about 2 mm–6 mm the coated glass substrate has a visible transmittance of at least about 70%, a normal emissivity ($E_n$) of less than about 0.07, a hemispherical emissivity ($E_h$) of less than about 0.075, a sheet resistance ($R_s$) of less than about 5.5 ohms/$_{sq.}$ and has the following reflectance and color coordinates wherein the glass side characteristics are;

$R_GY$, about 12 to 19
$a_h$, about −3 to +3
$b_h$, about −5 to −20 and wherein the film side characteristics are:

$R_FY$, about 8 to 12
$a_h$, about 0 to 6
$b_h$, about −5 to −30 wherein RY is the reflectance and $a_h$, $b_h$ are the color coordinates as measured in Hunter units, Ill. C, 10° observer.

In certain embodiments of that copending invention a sheet of glass, provided on one of its surfaces with a layering system as above-described, is employed with at least one other sheet of glass such that each is substantially parallel to the other, but spaced therefrom and sealed at their peripheral edges to form an insulating chamber therebetween thereby to form an insulating glass unit (IG) useful as a window, door or wall wherein the layer system is located on surface 24 as shown in FIG. 2 such that the reflectance and color coordinate characteristics are:

when viewed from outside:
$R_GY$, about 16 to 18
a*, about −3 to +3
b*, about 0 to −15 when viewed from inside:
$R_FY$, about 14 to 16
a*, about 0 to +5
b*, about 0 to −20 and the visible transmittance is at least about 63%, and preferably is about 65%–68%. When the coating system is located on surface 26 (FIG. 2), the reflectance and color coordinates are reversed from that above, but the transmittance remains the same.

The asterisk (*) here indicates, as described below, the color coordinates as measured conventionally by the Ill. C, 2° observer technique.

The term "outside" as used herein means as observed by a viewer from outside the dwelling in which the coated glass sheet (i.e. IG unit) is employed. The term "inside" as used herein means the opposite of "outside", i.e. the side as observed by a viewer from inside the dwelling in which the unit is placed (e.g. from within a room of a house or office building looking toward the "outside").

The layer systems disclosed in this copending invention are highly efficacious. Not only do they achieve excellent solar management properties but they are substantially non-reflective (e.g. below the objectionable 20% level) and durable (chemically and mechanically) as well. Nevertheless, it has now been found, quite surprisingly, and as a part of the subject invention, that by: (1) using a dual layer silver system of even more combined thickness than in this prior copending invention, (2) employing a relatively thick intermediate layer of $Si_3N_4$ in addition to an undercoat and overcoat of $Si_3N_4$, and (3) separating each layer with a nucleating layer of nickel or nichrome, still further reductions in reflectance are achieved, without unduly affecting the other desired characteristics listed above.

SUMMARY OF THE INVENTION

Generally speaking this invention achieves its unique results by providing a sputter-coated glass article comprised of a glass substrate having thereon from the glass outwardly, a layer system including:

a) a layer of $Si_3N_4$ having a thickness of about 300 Å–500 Å;

b) a layer of nickel or nichrome having a thickness of about 7 Å or less;

c) a layer of silver having a thickness of about 70 Å–130 Å;

d) a layer of nickel or nichrome having a thickness of about 7 Å or less;

e) a layer of $Si_3N_4$ having a thickness of about 700 Å–1,100 Å;

f) a layer of nickel or nichrome having a thickness of about 7 Å or less;

g) a layer of silver having a thickness of about 70 Å–190 Å;

h) a layer of nickel or nichrome having a thickness of about 7 Å or less; and i) a layer of $Si_3N_4$ having a thickness of about 350 Å–700 Å.

In certain preferred embodiments the thicknesses of the above layers are:

| layer | thickness (Å) |
| --- | --- |
| a | about 350–450 |
| b | about ≦7 |
| c | about 100–125 |
| d | about ≦7 |
| e | about 900–1,000 |
| f | about ≦7 |
| g | about 140–170 |
| h | about ≦7 |
| i | about 400–500 |

In certain particularly preferred embodiments the thicknesses of the above layers are:

| layer | thickness (Å) |
| --- | --- |
| a | about 400 |
| b | about 7 |

-continued

| layer | thickness (Å) |
|---|---|
| c | about 110 |
| d | about 7 |
| e | about 950 |
| f | about 7 |
| g | about 155 |
| h | about 7 |
| i | about 450 |

In such articles as contemplated by this invention, when the said glass substrate has a thickness of about 2 mm–6 mm, the coated glass substrate has a visible transmittance of at least about 70%, preferably about 72% –76%; a normal emissivity ($E_n$) of about 0.02–0.09, preferably about 0.03–0.06; a hemispherical emissivity ($E_h$) of about 0.03 to 0.12, preferably about 0.04 to 0.07; a sheet resistance ($R_s$) of about 2–10, preferably 3 –5 and has the following reflectance and color coordinates wherein the glass side characteristics are:

$R_G Y$, less than about 10, preferably about 4 –7;

$a_h$ is about –3 to +5, preferably about +2.5 to +4.5; and $b_h$ is about 0 to –10, preferably about –4.0 to –8.0;

and wherein the film side characteristics are:

$R_F Y$ is less than about 10, preferably about 3–7;

$a_h$ is about –3 to +5, preferably about 0.0 to 2.0; and $b_h$ is about 0 to –10, preferably about 0.0 to –2.0.; wherein RY is the reflectance and $a_h$, $b_h$ are the color coordinates as measured in Hunter units, Ill. C, 10° observer.

In certain embodiments of this invention, a sheet of glass, provided on one of its surfaces with a layer system as above-described, is employed with at least one other sheet of glass such that each is substantially parallel to the other, but spaced therefrom and sealed at their peripheral edges to form an insulating chamber therebetween thereby to form an insulating glass unit useful as a window, door or wall wherein the layer system is located on surface 24 as shown in FIG. 2 such that the reflectance and color coordinate characteristics are:

when viewed from outside:

$R_G Y$ is less than about 16 and preferably is about 9–12;

a*,about –3.0 to +3.0, and preferably about 0.0 to +2.0;

b*, about 0.0 to –8.0, and preferably about –4.5 to –6.5;

when viewed from inside:

$R_F Y$ is less than about 15 and preferably is about 9–12;

a*, about –3.0 to +3.0, and preferably about 0.0 to –2.0;

b*, about 0.0 to –8.0, and preferably about 0.0 to –2.0;

and the visible transmittance is at least about 63%, and preferably is about 65%–68%. When the coating system is located on surface 26 (FIG. 2), the reflectance and color coordinates are reversed from that about, but the transmittance remains the same. As aforesaid, and described below, the asterisk (*) indicates Ill. C, 2° observer.

This invention will now be described with respect to certain embodiments thereof, along with reference to the accompanying illustrations, wherein:

IN THE DRAWINGS

DETAILED DESCRIPTION OF EMBODIMENTS OF THE INVENTION

Figure 1:
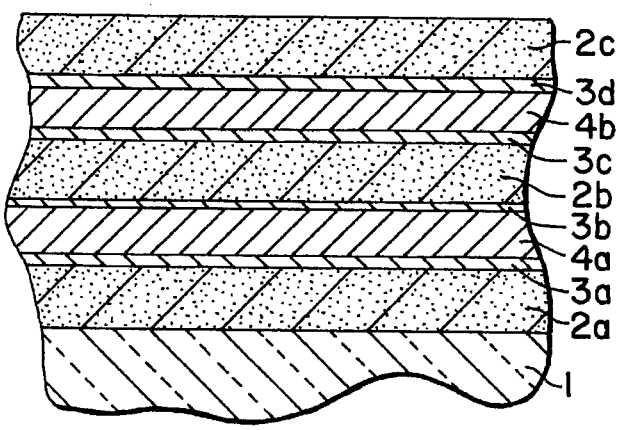
FIG. 1 is a partial side sectional view of a layer system in accordance with this invention.

Certain terms are prevalently used in the glass-coating art, particularly when defining the properties and solar management characteristics of coated glass used in the architectural field. Such terms are used herein in accordance with their well-known meaning. For example, as used herein:

Intensity of visible wavelength light "reflectance" is defined by its percentage and is reported as $R_x Y$, wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides. Alternatively, it is also reported as "$R_{vis.\ outside}$" or "$R_{vis.\ inside}$" with "G" being equivalent to "outside" and "F" being equivalent to "inside".

Color characteristics are measured on the "a" and "b" coordinates. At times herein these coordinates are indicated by the subscript "h" to signify the conventional use of the Hunter method (or units) Ill. C, 10° observer, according to ASTM D-2244-93 "Standard Test Method for Calculation of Color Differences From Instrumentally Measured Color Coordinates "Sep. 15, 1993 as augmented by ASTM E 308–85, Annual Book of ASTM Standards, Vol. 06.01 "Standard Method for Computing the Colors of Objects by Using the CIE System." At other times they are indicated with an asterisk (*) to indicate an alternative conventional standard, i.e. Ill. C, 2° observer also referenced in the aforesaid ASTM E 308-85 publication.

The terms "emissivity" and "transmittance" are well understood in the art and are used herein according to their well-known meaning. Thus, for example, the term "transmittance" herein means solar transmittance, which is made up of visible light transmittance, infrared energy transmittance, and ultraviolet light transmittance. Total solar energy transmittance is then usually characterized as a weighted average of these other values. With respect to these transmittances, visible transmittance, as reported herein, is characterized by the standard Illuminant C technique at 380–720 nm ; infrared is 800–2100 nm; ultraviolet is 300–400 nm; and total solar is 300–2100 nm. For purposes of emissivity, however, a particular infrared range (i.e. 2,500–40,000 nm) is employed, as discussed below.

Visible transmittance can be measured using known, conventional techniques. For example, by using a spectrophotometer, such as a Beckman 5240 (Beckman Sci. Inst. Corp.), a spectral curve of transmission is obtained. Visible transmission is then calculated using the aforesaid ASTM E–308 "Method for Computing the Colors of Objects by Using the CIE System" (Annual Book of ASTM Standards Vol. 14.02). A lesser number of wavelength points may be employed than prescribed, if desired. Another technique for measuring visible transmittance is to employ a spectrometer such as a commercially available Spectragard spectrophotometer manufactured by Pacific Scientific Corporation. This device measures and reports visible transmittance directly. As reported and measured herein, visible transmittance is by the Ill. C., 10° observer, Hunter technique (unless indicated otherwise).

"Emissivity" (E) is a measure, or characteristic of both absorption and reflectance of light at given wavelengths. It is usually represented by the formula:

$$E = 1 - \text{Reflectance}_{film}$$

For architectural purposes, emissivity values become quite important in the so-called "mid-range", sometimes also called the "far range" of the infrared spectrum, i.e. about 2,500–40,000 nm., for example, as specified by the WINDOW 4.1 program, LBL-35298 (1994) by Lawrence Berkley Laboratories, as referenced below. The term "emissivity" as used herein, is thus used to refer to emissivity values measured in this infrared range as specified by the 1991 Proposed ASTM Standard now ASTM designation: E1585-93] for measuring infrared energy to calculate emittance, as proposed by the Primary Glass Manufacturers Council and entitled "Test Method for Measuring and Calculating Emittance of Architectural Flat Glass Products Using Radiometric Measurements". In this Standard, emissivity is reported as hemispherical emissivity ($E_h$) and normal emissivity ($E_n$).

The actual accumulation of data for measurement of such emissivity values is conventional and may be done by using, for example, a Beckman Model 4260 spectrophotometer with "VW" attachment (Beckman Scientific Inst. Corp.). This spectrophotometer measures reflectance versus wavelength, and from this, emissivity is calculated using the aforesaid 1991 Proposed ASTM Standard which has been incorporated herein by reference.

Another term employed herein is "sheet resistance". Sheet resistance ($R_s$) is a well-known term in the art and is used herein in accordance with its well-known meaning. Generally speaking, this term refers to the resistance in ohms for any square of a layer system on a glass substrate to an electric current passed through the layer system. Sheet resistance is an indication of how well the layer is reflecting infrared energy, and is thus often used along with emissivity as a measure of this characteristic, so important in many architectural glasses. "Sheet resistance" is conveniently measured by using a 4-point probe ohmmeter, such as a dispensable 4 point resistivity probe with a Magnetron Instruments Corp. head, Model M-800 produced by Signatone Corp. of Santa Clara, Calif.

"Chemical durability" is used herein synonymously with the term "chemical resistance" or "chemical stability" terms that have been used in the past in the art. Chemical durability is determined by boiling a 2"×5" sample of a coated glass substrate in about 500 cc of 5% HCl for one hour (i.e. at about 220° F.). The sample is deemed to pass this test (and thus the layer system is deemed to have "chemical durability") if the sample's layer system shows no pinholes greater than about 0.003" in diameter after this one hour boil.

"Mechanical durability" as used herein is defined by one of two tests. The first test uses a Pacific Scientific Abrasion Tester (or equivalent) wherein a 2"×4"×1" nylon brush is cyclically passed over the layer system in 500 cycles employing 150 gm of weight, applied to a 6"×17" sample. In the other, alternative test, a conventional Taber abrader (or equivalent) is used to subject a 4"×4 sample to 300 revolutions of two C.S. 10 F abrasion wheels each having attached a 500 gm weight. In either test, if no substantial, noticeable scratches appear when viewed with the naked eye under visible light, the test is deemed passed, and the article is said to be mechanically durable.

Thicknesses of the various layers in the systems reported are measured by, and thus the term, "thickness" as used herein is defined by, the use of known optical curves, or, in the alternative, the use of a conventional needle ellipsometer (i.e. profilometer). Such procedures and techniques are well-known to the skilled artisan and thus need no further explanation except to note that thicknesses reported and used herein are optically determined thicknesses reported in angstrom units.

Turning now to FIG. 1, there is shown a partial cross-sectional sketch of a typical embodiment of this invention.

As can be seen, there is employed a typical glass substrate 1 used conventionally in the architectural art. Such glass is preferably made by the conventional "float" process and thus is referred to as "float glass". The usual thickness thereof may be from about 2 mm–6 mm. The composition of the glass is not critical, and may vary widely. Typically, the glass employed is one of the soda-lime-silica family of glass well-known in the glass art.

The process and apparatus used to form layers $2a$–$e$, $3a$–$d$, and $4a$, b on glass substrate 1 may be a conventional multi-chamber (multi-target) sputter-coating system such as is produced by Airco, Inc. In this respect, the preferred sputter-coating process for use herein is the same as that disclosed in U.S. Pat. No. 5,344,718, the entire disclosure of which having been previously incorporated herein by reference. Layers $2a$, $2b$ and $2c$ in this respect are layers consisting essentially of $Si_3N_4$, with perhaps having present therein a small amount of a dopant and/or other target material sputtered with the Si, and employed therewith in the target, for example, to maintain the anode in the system conductive. Such a concept is taught in copending application Ser. No. 08/102,585, filed Aug. 15, 1993, now U.S. Pat. No. 5,403,458. The choice of such target dopants and/or conductive materials are usually kept to a minimum so as to achieve their purpose while not adversely interfering with the purposes of the $Si_3N_4$ in the system.

The thickness of undercoat layer $2a$ is about 300 Å–550 Å. This thickness has been found to be important in order to achieve the purposes of this invention. Preferably, the thickness of layer $2a$ is above 350 Å–450 Å and most preferably is about 400 Å. The thickness of overcoat layer $2c$ is about 350 Å–700 Å. Preferably, its thickness is about 400 Å–500 Å and most preferably is about 450 Å. Such a thickness likewise has been found to be important in order to achieve the purposes of this invention.

The four layers $3a$, $b$, $c$, and d are sandwiching, nucleation layers for the two silver layers $4a$ and $4b$. These nucleation layers $3a$, $3b$, $3c$, and $3d$ consist essentially of metallic nickel or a metallic nichrome (e.g. 80/20 Ni:Cr by weight). If nichrome is used, it is preferred that at least a portion of the chrome be converted during the sputtering process into a nitride as taught and for the reasons set forth in U.S. Pat. No. 5,344,718. The thicknesses employed for these four nucleation layers is preferably the same as those of the aforesaid '718 patent, i.e. below about 7 Å and preferably about 6 Å or less.

A significant feature of this invention, lending to its uniqueness over the above-described prior art, is the use of dual, relatively thick metallic silver layers $4a$, $4b$ in combination with intermediate layer $2b$, which itself is a substantially thick layer of $Si_3N_4$. Joining layer $2b$ to layers $4a$ and $4b$, of course, are two of the four nucleating layers $3b$, $3c$ as described above.

Metallic silver layer $4a$ is the underlying silver layer and should be of a thickness of about 70 Å–130 Å, preferably about 100 Å–125 Å and most preferably about 110 Å. Metallic silver layer $4b$ is the overlying silver layer and should be of a thickness of about 70 Å–190 Å preferably 140 Å–170 Å and most preferably about 144 Å. Together, these two silver layers are the principal reasons why the subject invention achieves its very low emissivity values as set forth above. In this respect, it is preferred that the overlying silver layer $4b$ be somewhat thicker than underlying silver layer $4a$. Emissivity values are then adjustable principally by varying the thickness of the overlying silver layer, although the underlying silver layer does have a small affect upon emissivity. Both layers, however, are important to the achievement of the desired visible transmittance, reflection and color characteristics. In this respect, in order to achieve emissivity levels as aforesaid without adversely affecting the other desired characteristics, the total thickness of layers 4a, 4b should be about 200 Å to 300 Å and preferably about 225 Å to 275 Å and most preferably 265 Å.

Intermediate $Si_3N_4$ layer 2b is an important feature of this invention. It is designed to be substantially thicker than either of the two other $Si_3N_4$ layers 2a and 2c, and in the preferred embodiments is significantly thicker than layers 2a and 2c combined. While the reasons, therefore, are not completely understood, it is believed that this thickened layer 2b enables the use of a rather thick combined silver layer content for low emissivity values while maintaining the desired levels of durability (chemical and mechanical), low, non-mirror like reflectance (e.g. $R_GY$ and $R_FY$ less than about 10 monolithic and less than about 16 in an IG unit), visible transmittance and substantially neutral or non-purple color characteristics, both in a monolithic sheet and an IG unit. Thus, to achieve these purposes intermediate $Si_3N_4$ layer 2b should have a thickness of about 700 Å–1,100 Å, preferably 900 Å–1,000 Å and most preferably about 950 Å.

Figure 2:
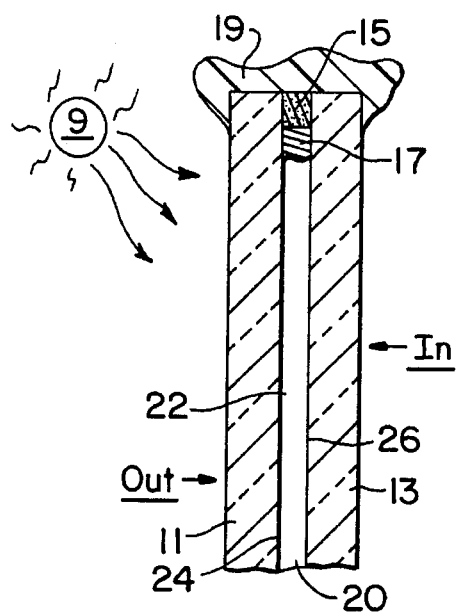
FIG. 2 is a partial cross-sectional view of an IG unit as contemplated by this invention.

The layer systems of this invention as described with respect to FIG. 1 attain a unique combination of solar management properties which become particularly acceptable when the coated glass is employed in an IG unit such as schematically illustrated in FIG. 2 (discussed below). Generally speaking when the glass substrate is about 2 mm–6 mm thick; the monolithic coated-glass sheet (using, of course, clear glass) has a visible transmittance of at least about 70% and preferably about 72% –76%. This latter range yields excellent visibility but, given the nature of the layer stack of this invention, may be adjusted to further achieve excellent shading qualities as well, if desired. In addition, the coated glass sheet has a normal emissivity ($E_n$) of less than about 0.02–0.09, preferably about 0.03–0.06; a hemispherical emissivity ($E_h$) of less than about 0.03–0.12, preferably about 0.03–0.08; and a sheet resistance ($R_s$) of about 2–10 ohms/$_{sq.}$, preferably about 3.0–5.0 ohms/$_{sq.}$. Still further such a monolithic coated glass sheet will have the following reflectance and color coordinates:

|  | Brd Range | Preferred | Most Preferred |
|---|---|---|---|
| $R_GY$ | less than about 10 | about 4–7 | about 5 |
| $a_h$ | about −3 to +5 | about +2.5 to +4.5 | about +4 |
| $b_h$ | about 0 to −10 | about −4.0 to −8.0 | about −7 to −8 |
| $R_FY$ | less than about 10 | about 3–7 | about 3 to 4 |
| $a_h$ | about −3 to +5 | about 0.0 to +2.0 | about +1 to +2 |
| $b_h$ | about 0 to −10 | about 0.0 to −2.0 | about −1 |

It is to be noted here that the reflectance characteristics of this invention distinguish it from the markedly different reflectance characteristics of the embodiments of the aforesaid copending invention which employs no intermediate $Si_3N_4$ layer and a single silver layer. In this respect, in our copending invention, the reflectance characteristics achieved satisfied a certain, important, segment of the marketplace by achieving higher reflectances, i.e. $R_GY$, about 12–19 and $R_FY$ about 8–12 in monolithic form While not "mirror-like" the ultimate product achieved a certain asthetic quality which a certain segment of the user population desires in architectural glass windows. In the subject invention, on the other hand, another, important, segment of the marketplace is satisfied by a achieving significantly lower reflectances, e.g. less than about 10 for $R_GY$ and $R_FY$, and preferably from about 4–7 and 3–7 for $R_GY$ and $R_FY$ respectively, in monolithic form. At the same time, as can be seen from the color coordinates, substantially neutral color values are obtained without depending on masking which was, generally speaking, a requirement for achieving a neutral color appearance in the embodiment of the aforesaid copending invention. In addition, excellent low-E values, durability (chemical and mechanical) and transmittance properties; both for a single glass sheet and in an IG unit (discussed further below) are achieved.

As referenced above, FIG. 2 illustrates, somewhat schematically, a typical IG unit in accordance with this invention. In order to differentiate the "inside" of the IG unit labelled "In" from its "outside" labelled "Out", the sun 9 is schematically presented. As can be seen such an IG unit is made up of "outside" glass pane 11 and "inside" glass pane 13. These two glass panes (e.g. 2 mm–6 mm thick) are sealed at their peripheral edges by a conventional sealant 15 and desiccant strip 17. The panes are then retained in a conventional window or door retaining frame 19 (shown in partial schematic form). By sealing the peripheral edges of the glass sheets and replacing the air in chamber 20 with a gas such as argon, a typical, high insulating value IG unit is formed. Chamber 20 in this respect is typically about ½" in width.

By employing the layer stack as above-described, as layer system 22 on wall 24 of outside glass sheet 11 within the chamber 20, as illustrated, or alternatively on wall 26 of the inside glass sheet 13 within chamber 20 (not shown), a particularly unique, non-mirror-like, non-purple or red/blue IG unit is formed. In this respect, it is understood, of course, that FIG. 2 illustrates only one embodiment of an IG unit in which the unique layer systems of this invention may be employed. In fact, the layer systems of this invention are available for use in a wide variety of IG units generally, including those having more than two panes of glass. Generally speaking, however, the IG units of the subject invention, when the layer system is located on the wall of either glass sheet within an insulating chamber of the IG unit, will typically have the following range of characteristics:

TABLE 1

| Performance Characteristics | Wall 24 | | Wall 26 | |
|---|---|---|---|---|
| | Range | Preferred | Range | Preferred |
| Visible Transmittance (%) | >63 | 65–68 | same | same |
| Reflection (%, visible, outside) | <16 | 9–12 | <15 | 8–11 |
| Reflection (%, visible inside) | <15 | 8–11 | <16 | 9–12 |
| Shading coefficient (S.C.) | .4–.8 | .45–.55 | .5–.8 | .55–.65 |
| Solar heat gain coefficient | (S.C. × 0.87) | | | |
| U (Winter) [BTU/ft²/hr/°F.] | 0.20–0.30 | 0.25 | same | same |
| U (Summer) [BTU/ft²/hr/°F.] | 0.24–0.26 | 0.24 | same | same |
| Relative heat | 90–110 | 92–102 | 100–140 | 120–130 |

TABLE 1-continued

| Performance | Wall 24 | | Wall 26 | |
|---|---|---|---|---|
| Characteristics | Range | Preferred | Range | Preferred |
| gain [BTU/ ft²/hr/ °F.] | | | | |
| Color Characteristics | | | | |
| Ty | 63–70 | 65–68 | | |
| a* | −5 to +5 | 0 to −4 | same | same |
| b* | −10 to +10 | 0 to +4 | same | same |
| Ry outside (Approx. R vis. outside, above) | | | | |
| a* | +3 to −3 | 0 to −2.0 | +3 to −3 | 0 to +2 |
| b* | 0 to −8 | −4.5 to −6.5 | 0 to −8 | 0 to −2.0 |
| Ry inside (Approx. R vis. inside above) | | | | |
| a* | +3 to −3 | 0 to +2 | +3 to −3 | 0 to −2.0 |
| b* | 0 to −8 | 0 to −2.0 | 0 to −8 | −4.5 to −6.5 |

The asterisk (*) indicates measurement by the aforesaid Ill. C. 2° observer ASTM technique.

In addition to the above characteristics, in certain preferred embodiments, the following performance characteristics are achieved if such a system is used in an IG unit with a ½" wide chamber 20 filled with Argon as those characteristics are computed according to the software program known as WINDOW 4.1" from Lawrence Berkley Laboratories of Berkeley, Calif.; and, in addition, using a Hitachi spectrophotometer to get input data for: (1) visible and solar transmittance; (2) solar reflection, film side and glass side; and (3) a Beckman infrared spectrophotometer to measure emittance. The WINDOW 4.1 program, 1988–1994 is a copyrighted program of the Regents of the University of California entitled "Fenestration Production Thermal Analysis Program."

TABLE 2

| Performance Characteristic | Wall 24 | Wall 26 | Monolithic Sheet |
|---|---|---|---|
| $T_{visible}$ | 66 | 66 | |
| $R_{vis., outside}$ | 9 | 11 | |
| $R_{vis., inside}$ | 11 | 9 | |
| $T_{solar}$ | 36 | 36 | |
| $R_{solar}$ | 32 | 36 | |
| Shading coeff. | 0.46 | 0.61 | |
| Solar heat gain coeff. | 0.392 | 0.522 | |
| $U_{Winter}$ | 0.25 | 0.25 | |
| $U_{Summer}$ | 0.24 | 0.24 | |
| $E_n$ | 0.054 | 0.054 | |
| $E_h$ | 0.060 | 0.060 | |
| Relative heat gain | 94 | 125 | |
| $R_s$ (ohms/sq.) | 3.39 | 3.39 | |
| Color (*Ill. C. 2° observer) | | | (h) Hunter, Ill. C. 10° Observer |
| Ty | 65.7 | 65.7 | 72.4 |
| a* | −3.2 | −3.2 | −2.59$a_h$ |
| b* | 2.76 | 2.76 | −2.57$b_h$ |
| $R_GY$ (outside) | 8.8 | 10.8 | 4.91 |
| a* | +1.81 | +0.46 | +4.13$a_h$ |
| b* | −6.4 | −1.1 | −7.62$b_h$ |
| $R_FY$ (inside) | 10.8 | 8.8 | 3.48 |
| a* | +0.46 | +1.81 | +1.64$a_h$ |
| b* | −1.1 | −6.4 | −0.69$b_h$ |

In this embodiment, the monolithic glass sheet was subjected to both the boil test to determine chemical durability and the aforesaid Pacific Scientific Abrasion tester to determine mechanical durability. Both tests were passed.

An Airco ILS-1600 research coater was employed to form the layer stack in this embodiment. This coater has three cathodes consisting of: cathode #1, silicon with 5% aluminum dopant; cathode #2, silver; and cathode #3, 80/20 percent by weight Ni:Cr, nichrome. The layer stack is that as shown in FIG. 1 wherein:

| Material | Layer No. | Thickness (approx.) |
|---|---|---|
| $Si_3N_4$* | 2a | 450Å |
| Ni:Cr | 3a | 7Å |
| Ag | 4a | 155Å |
| Ni:Cr | 3b | 7Å |
| $Si_3N_4$* | 2b | 950Å |
| Ni:Cr | 3c | 7Å |
| Ag | 4b | 110Å |
| Ni:Cr | 3d | 7Å |
| $Si_3N_4$* | 2c | 400Å |

*A minor amount of the Al dopant is found in this layer in approximately a 5% amount.

The monolithic glass sheet employed was clear, soda-lime-silica float glass having a thickness of 0.087 inches. The following coater settings were employed:

TABLE 3

| LAYER | MATERIAL | * $N_2$ % | Ar % | PRESSURE (Torr) | CATHODE POWER | CATHODE VOLTAGE | CATHODE AMPS | % LINE SPEED | No. OF PASSES |
| --- | --- | --- | --- | --- | --- | --- | --- | --- | --- |
| 1 | Silicon | 50 | 50 | $4.0 \times 10^{-4}$ | 4.9 KW | 483 V | 10.5 A | 42.5 | 8 |
| 2 | Nichrome | 50 | 50 | $3.1 \times 10^{-4}$ | 0.7 KW | 387 V | 2 A | 100 | 1 |
| 3 | Silver | 0 | 100 | $5.7 \times 10^{-4}$ | 2.8 KW | 454 V | 6.4 A | 100 | 1 |
| 4 | Nichrome | 50 | 50 | $3.1 \times 10^{-4}$ | 0.3 KW | 344 V | 1 A | 100 | 1 |
| 1 | Silicon | 50 | 50 | $4.0 \times 10^{-4}$ | 4.9 KW | 483 V | 10.5 A | 42.5 | 19 |
| 2 | Nichrome | 50 | 50 | $3.1 \times 10^{-4}$ | 0.7 KW | 397 V | 2 A | 100 | 1 |
| 3 | Silver | 0 | 100 | $5.7 \times 10^{-4}$ | 5.0 KW | 498 V | 10.5 A | 100 | 1 |
| 4 | Nichrome | 50 | 50 | $3.1 \times 10^{-4}$ | 0.3 KW | 344 V | 1 A | 100 | 1 |
| 1 | Silicon | 50 | 50 | $4.0 \times 10^{-4}$ | 4.9 KW | 483 V | 10.5 A | 42.5 | 8 |

*Optionally, the nichrome layers may be sputter-coated in a 100% Ar atmosphere, thereby preventing a nitride of the chrome from being formed. Additionally, the silver layers may be sputter-coated in a partially containing $N_2$ atmosphere because silver does not form a nitride.

In contrast to or in comparison with the characteristics of the above embodiment of this invention are the following characteristics by applying the above-described WINDOW 4.1 technique (½" Argon chamber) to the aforesaid prior art commercial IG product Cardinal -171.

TABLE 4

| Performance Characteristic | Wall 24 | Wall 26 | Monolithic Sheet |
| --- | --- | --- | --- |
| $T_{visible}$ | 73 | 73 | |
| $R_{vis., outside}$ | 11 | 12 | |
| $R_{vis., inside}$ | 12 | 11 | |
| $T_{solar}$ | 41 | 41 | |
| $R_{solar}$ | 33 | 36 | |
| Shading coeff. | 0.52 | 0.62 | |
| Solar heat gain coeff. | 0.443 | 0.531 | |
| $U_{Winter}$ | 0.25 | 0.25 | |
| $U_{Summer}$ | 0.24 | 0.24 | |
| $E_n$ | 0.051 | 0.051 | |
| $E_h$ | 0.060 | 0.060 | |
| Relative heat gain | 106 | 127 | |
| $R_s$ (ohms/sq.) | 3.27 | 3.27 | |
| Color (*Ill. C. 2° observer) | | | (h) Hunter, Ill. C. 10° Observer |
| Ty | 73.5 | 73.5 | 80.7 |
| a* | −1.8 | −1.8 | $-1.26a_h$ |
| b* | +2.74 | +2.74 | $+2.62b_h$ |
| $R_GY$ (outside) | 11.1 | 12.0 | 5.98 |
| a* | +2.14 | −3.4 | $+2.37a_h$ |
| b* | −5.5 | +0.49 | $-5.68b_h$ |
| $R_FY$ (inside) | 12.0 | 11.1 | 4.90 |
| a* | −3.4 | +2.14 | $-2.01a_h$ |
| b* | +.04 | −5.5 | $+0.60b_h$ |

It is to be pointed out in this respect that this Cardinal -171 IG product has achieved significant commercial acceptability in the marketplace. Its only real drawback is its lack of chemical durability. Its precise layer stack system is not known. However, it is believed to be consistent with that as taught in the aforesaid U.S. Pat. No. 5,302,449.

As can be seen, by comparing the results of this invention with those of this already commercially accepted product, the subject invention has achieved a high level of competitiveness using a significantly different layering system. For example, while the Cardinal product achieves a bit higher visible transmittance than the embodiment of the subject invention (73% vs. 66%), nevertheless this 66% is not only well within acceptable levels but, when lower shading coefficients as explained above, are desirable (e.g. to reduce air conditioning costs in hot weather), this 66% is more desirable commercially than the 73%. Of particular importance, however, is this invention's achievement of superior chemical durability. Both products have very low, substantially equal emissivities and substantially equal and excellent U values.

With respect to the above-referenced IG performance characteristics not previously defined herein, such as $U_{winter}$, $U_{summer}$, etc., those terms are well understood in the art and are used here in accordance with their accepted meaning. For example, the "U" value is a measure of the insulating property of the IG system. $U_{winter}$ and $U_{summer}$ are determined according to NFRC 100-91 (1991), a standard subsumed in the WINDOW 4.1 software. "Shading coefficient" ("S.C.") is determined in accordance with NFRC 200-93 (1993), by first determining "Solar heat gain coefficient" and dividing by 0.87. "Relative heat gain" (r.h.g.) is determined by this same NFRC 200-93 procedure. "$T_{solar}$" means total solar energy transmittance, a known combination of UV, visible and IR transmittance "R" similarly, means total solar reflectance, a known combination of UV, visible, and IR reflectance.

Figure 3:
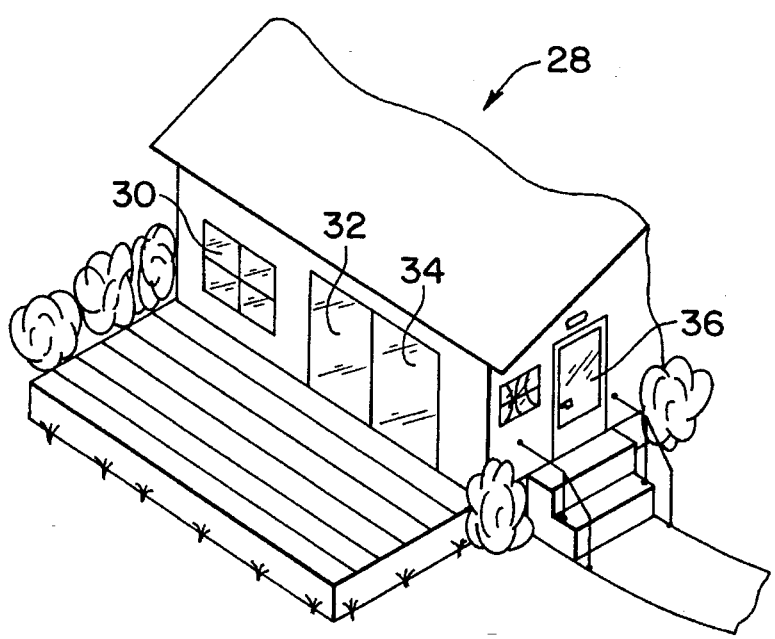
FIG. 3 is a partial schematic perspective view of a house employing as a window, door and wall an IG unit such as illustrated in FIG. 2.

FIG. 3 is a partial schematic view of a typical family dwelling 28 having various portals in which the subject invention may be employed. For example, window 30 may employ either a monolithic sheet of glass having a layer stack of this invention thereon, or employ as a "storm window" an IG unit of this invention such as is illustrated in FIG. 2. Similarly, sliding wall panel 32 or non-sliding wall panel 34 as well as front door panel 36 may be so constructed by employing this invention, either as a monolithic glass sheet or as an IG unit.

Once given the above disclosure many other features, modifications and improvements will become apparent to the skilled artisan. Such other features, modifications and improvements are therefore considered to be a part of this invention, the scope of which is to be determined by the following claims:

We claim:

1. A sputter-coated glass article comprised of a glass substrate having thereon from the glass outwardly, a layer system including:

a) a layer of $Si_3N_4$ having a thickness of about 300 Å–500 Å;

b) a layer of nickel or nichrome having a thickness of about 7 Å or less;

c) a layer of silver having a thickness of about 70 Å–130 Å;

d) a layer of nickel or nichrome having a thickness of about 7 Å or less; and e) a layer of $Si_3N_4$ having a thickness of about 700 Å–1,100 Å;

f) a layer of nickel or nichrome having a thickness of about 7 Å or less;

g) a layer of silver having a thickness of about 70 Å–190 Å, wherein said layer (g) is thicker than said layer (c);

h) a layer of nickel or nichrome having a thickness of about 7 Å or less; and i) a layer of $Si_3N_4$ having a thickness of about 350 Å–700 Å; wherein when said glass substrate has a thickness of about 2 mm–6 mm, said coated glass substrate has a visible transmittance of about 70% or greater, a normal emissivity ($E_n$) of about 0.02 –0.09, a hemispherical emissivity ($E_h$) of about 0.03–0.12, a sheet resistance ($R_s$) of about 2–10 ohms/$_{sq.}$ and having the following reflectance and color coordinates wherein the glass side characteristics are:

$R_GY$, less than about 10
$a_h$ is about –3 to +5
$b_h$ is about 0 to –10 and wherein the film side characteristics are:

$R_FY$, less than about 10
$a_h$ is about –3 to +5
$b_h$ is about 0 to –10 wherein RY is the reflectance and $a_h$, $b_h$ are the color coordinates as measured in Hunter units, Ill., C, 10° observer.

2. An article according to claim 1, wherein:

the thickness of layer (a) is about 350 Å–450 Å, the thickness of layer (c) is about 100 Å–125 Å, the thickness of layer (e) is greater than about 900 Å–1,000 Å, the thickness of layer (g) is about 140 Å–170 Å, and the thickness of layer (i) is about 400 Å–500 Å.

3. An article according to claim 2, wherein:

each of said layers (b), (d), (f), and (h) is less than about 7 Å.

4. An article according to claim 3 having a visible transmittance of 72% –76%; a normal emissivity ($E_n$) of about 0.03–0.06; a hemispherical emissivity ($E_h$) of about 0.03 to 0.08, a sheet resistance of about 3–5, and having the following reflectance and color coordinates:

| | GLASS SIDE |
|---|---|
| $R_GY$, | about 4–7 |
| $a_h$, | about +2.5 to +4.5 |
| $b_h$, | about –4 to –8 |
| | FILM SIDE |
| $R_FY$, | about 3–7 |
| $a_h$, | about 0.0 to +2.0 |
| $b_h$, | about 0.0 to –2.0 |

5. An article according to claim 1, wherein said visible transmittance is about 72%–73%, said $E_n$ is about 0.05–0.06, said $E_h$ is about 0.060 and said $R_s$ is about 3.0–4.0 ohms/$_{sq.}$

6. An article according to claim 5, wherein said layers have the following thicknesses:

| layer | thickness (Å) |
|---|---|
| a | about 400 |
| b | about 7 |
| c | about 110 |
| d | about 7 |
| e | about 950 |
| f | about 7 |
| g | about 155 |
| h | about 7 |
| i | about 450 |

7. An article according to claim 5, having the following characteristics:

Ty, about 72.4
$a_h$, about –2.59
$a_b$, about –2.57
$R_GY$, about 4.91
$a_h$, about +4.13
$a_b$, about –7.62
$R_FY$, about 3.43
$a_h$, about +1.64
$a_b$, about –0.69

8. An article according to claim 1, wherein said layer system is chemically and mechanically durable.

9. An article according to claim 1, wherein said coated substrate when viewed from the glass side, the article has a color appearance within the range of neutral to slightly blue.

10. An insulating glass unit comprised of at least two substantially parallel, spaced sheets of glass wherein at least one sheet of glass is a glass article according to claims 1, 2, 3, 4, 5, 6, 7, 8, or 9.

11. An insulating glass unit comprised of at least two substantially parallel, spaced sheets of glass wherein at least one sheet of glass is a glass article according to claim 1.

12. An insulating glass unit according to claim 11, wherein said two sheets of glass are sealed together at their peripheral edges thereby to define an insulating chamber therebetween, and wherein said layer system is located on a surface of one of said glass sheets within said insulating chamber.

13. An insulating glass unit according to claim 12, wherein said unit is an insulating glass window, door or wall.

14. An insulating glass unit according to claim 11, wherein said layer system has the following thicknesses:

| layer | thickness (Å) |
|---|---|
| a | about 350–450 |
| b | about 7 or less |
| c | about 100–125 |
| d | about 7 or less |
| e | about 900–1,000 |
| f | about 7 or less |
| g | about 140–170 |
| h | about 7 or less |
| i | about 400–500 |

15. An insulating glass unit according to claim 14, wherein said layers have the following thicknesses:

| layer | thickness (Å) |
|---|---|
| a | about 400 |
| b | about 7 |
| c | about 110 |
| d | about 7 |
| e | about 950 |
| f | about 7 |
| g | about 155 |
| h | about 7 |
| i | about 450 | wherein said layer system is located on the surface of the outside glass sheet within said insulating chamber and has the following approximate characteristics:

| | |
|---|---|
| $T_{visible}$ | 66 |
| $R_{vis.\ outside}$ | 9 |
| $R_{vis.\ inside}$ | 11 |
| $T_{solar}$ | 36 |

19
-continued

| | |
|---|---|
| $R_{solar}$ | 32 |
| Shading Coeff. | 0.46 |
| S.H.G.C. | 0.392 |
| $U_{Winter}$ | 0.25 |
| $U_{Summer}$ | 0.24 |
| $E_n$ | 0.054 |
| $E_h$ | 0.060 |
| Relative Heat Gain | 94 |
| $R_s$ | 3.39 |
| Ty | 65.7 |
| a* | −3.2 |
| b* | +2.76 |
| $R_Y Y$ (outside) | 8.8 |
| a* | +1.81 |
| b* | −6.4 |
| $R_F Y$ (inside) | |
| a* | +0.46 |
| b* | −1.1 | wherein said asterisk (*) indicates measurement by the Ill. C 2° observer ASTM technique.

16. An insulating glass unit according to claim 14, wherein said layers have the following thicknesses:

| layer | thickness (Å) |
|---|---|
| a | about 400 |
| b | about 7 |
| c | about 110 |
| d | about 7 |
| e | about 950 |
| f | about 7 |
| g | about 155 |
| h | about 7 |
| i | about 450 | wherein said layer system is located on the surface of the inside glass sheet within said insulating chamber and has the following approximate characteristics:

| | |
|---|---|
| $T_{visible}$ | 66 |
| $R_{vis.\ outside}$ | 11 |
| $R_{vis.\ inside}$ | 9 |
| $T_{solar}$ | 36 |
| $R_{solar}$ | 36 |
| Shading Coeff. | 0.61 |
| S.H.G.C. | 0.522 |
| $U_{Winter}$ | 0.25 |
| $U_{Summer}$ | 0.24 |
| $E_n$ | 0.054 |
| $E_h$ | 0.060 |
| Relative Heat Gain | 125 |
| $R_s$ | 3.39 |
| Ty | 65.7 |
| a* | −3.2 |
| b* | +2.76 |
| $R_G Y$ (outside) | 10.8 |
| a* | +0.46 |
| b* | −1.1 |
| $R_F Y$ (inside) | 8.8 |
| a* | +1.81 |
| b* | −6.4 | wherein said asterisk (*) indicates measurement by the Ill. C 2° observer ASTM technique.

17. An insulating glass unit according to claims 15 or 16, wherein said layer system is chemically and mechanically durable.

* * * * *